United States Patent
Padfield

(12) 
(10) Patent No.: US 6,817,197 B1
(45) Date of Patent: Nov. 16, 2004

(54) INTAKE AIR DEHUMIDIFICATION SYSTEM FOR AN INTERNAL COMBUSTION ENGINE

(75) Inventor: Jon R. Padfield, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 10/659,460

(22) Filed: Sep. 10, 2003

(51) Int. Cl.$^7$ .......................... F25B 49/00; F25D 17/04
(52) U.S. Cl. ...................... 62/176.6; 62/3.4; 236/44 C; 123/524
(58) Field of Search ........................... 62/3.2, 3.4, 3.61, 62/176.2, 176.6; 236/44 A, 44 C; 123/540, 542, 556

(56) References Cited

U.S. PATENT DOCUMENTS

| | | | |
|---|---|---|---|
| 4,125,092 A | | 11/1978 | Inamura |
| 4,141,323 A | | 2/1979 | Hart |
| 4,243,202 A | | 1/1981 | Inamura |
| 4,289,508 A | | 9/1981 | Robert |
| 4,306,519 A | | 12/1981 | Schoenhard |
| 4,418,527 A | | 12/1983 | Schlom et al. |
| 4,702,074 A | | 10/1987 | Munk |
| 4,773,846 A | | 9/1988 | Munk |
| 5,054,457 A | | 10/1991 | Sakamoto |
| 5,065,704 A | | 11/1991 | Powell |
| 5,365,784 A | * | 11/1994 | Morrissey ................. 73/335.02 |
| 5,368,786 A | * | 11/1994 | Dinauer et al. .............. 261/130 |
| 5,540,191 A | | 7/1996 | Clarke |
| 5,697,331 A | | 12/1997 | Hsu |
| 5,809,981 A | | 9/1998 | Berg-Sonne |
| 5,871,001 A | | 2/1999 | Pelkey |
| 5,921,088 A | * | 7/1999 | Imaizumi et al. .............. 62/3.4 |
| 6,006,540 A | | 12/1999 | Coletti |
| 6,006,730 A | | 12/1999 | Rutke et al. |
| 6,213,198 B1 | * | 4/2001 | Shikata et al. .............. 165/202 |
| 6,257,211 B1 | | 7/2001 | Vela, Jr. |
| 6,293,262 B1 | | 9/2001 | Craig et al. |
| 6,367,284 B1 | | 4/2002 | McCarville |
| 6,394,076 B1 | | 5/2002 | Hudelson |
| 6,408,831 B1 | | 6/2002 | Craig et al. |
| 6,575,148 B1 | | 6/2003 | Bhargava et al. |

* cited by examiner

Primary Examiner—Marc Norman
(74) Attorney, Agent, or Firm—Barnes & Thornburg

(57) ABSTRACT

An intake air dehumidification system for an internal combustion engine includes a peltier junction device responsive to at least one control signal to cool, and therefore condense moisture from, ambient air supplied by an air intake conduit to an intake manifold of the engine. Specific humidity of the ambient air supplied to the intake manifold is determined, and a control circuit is provided to produce the at least one control signal as a function of the specific humidity to maintain the specific humidity of the ambient air supplied to the intake manifold near a target humidity value.

32 Claims, 4 Drawing Sheets

US 6,817,197 B1

INTAKE AIR DEHUMIDIFICATION SYSTEM FOR AN INTERNAL COMBUSTION ENGINE

FIELD OF THE DISCLOSURE

This disclosure relates generally to systems for controlling the humidity of intake air supplied to an internal combustion engine, and more specifically to systems for dehumidifying engine intake air.

BACKGROUND OF THE DISCLOSURE

Differing levels of specific humidity in the atmosphere are known to impact the operation of internal combustion engines generally, and of spark-ignited engines in particular. For example, in spark-ignited, natural gas engines, increased levels of specific humidity tend to slow combustion by decreasing heat release rates and also by increasing the duration of individual combustion events.

Heretofore, systems have been devised to compensate for such adverse humidity effects by manipulating one or more engine operating parameters. It is desirable to alternatively control humidity of the air entering the engine such that the humidity of the engine intake air is maintained near a target humidity value.

SUMMARY OF THE DISCLOSURE

The present invention may comprise one or more of the following features or combinations thereof. An intake air dehumidification system for an internal combustion engine may comprise an intake conduit having one end coupled to an intake manifold of the engine and an opposite end configured to receive ambient air and a peltier junction device responsive to at least one control signal to cool, and therefore condense moisture from, ambient air supplied by the intake conduit to the intake manifold. Means may be provided for determining a specific humidity value corresponding to specific humidity of the ambient air supplied to the intake manifold, and a control circuit may be provided to produce the at least one control signal as a function of the specific humidity value to maintain the specific humidity of the ambient air supplied to the intake manifold near a target humidity value. The system may further include means for dissipating the moisture condensed from the ambient air by the peltier junction device.

The means for determining a specific humidity value may include a temperature sensor positioned downstream of the peltier junction device and producing a temperature signal indicative of the temperature of the ambient air entering the intake manifold, a pressure sensor positioned downstream of the peltier junction device and producing a pressure signal indicative of the pressure within the intake manifold, and a relative humidity sensor positioned downstream of the peltier junction device and producing a relative humidity signal indicative of the relative humidity of the ambient air entering the intake manifold, wherein the control circuit is configured to produce the specific humidity value as a function of the temperature signal, the pressure signal and the relative humidity signal. The control circuit may include a closed-loop control strategy configured to produce an error value as a difference between the target humidity value and the specific humidity value, and to produce the at least one control signal in a manner that minimizes the error value. For example, the control circuit may include a controller responsive to the error value to produce the at least one control signal. Alternatively, the control circuit may include a table mapping error values to corresponding control signal values, the table responsive to the error value to produce the at least one control signal.

Alternatively, the means for determining a specific humidity value may include a temperature sensor positioned upstream of the peltier junction device and producing a temperature signal indicative of the temperature of the ambient air entering the intake conduit, a pressure sensor positioned upstream of the peltier junction device and producing a pressure signal indicative of the pressure of ambient air entering the intake conduit, and a relative humidity sensor positioned upstream of the peltier junction device and producing a relative humidity signal indicative of the relative humidity of the ambient air entering the intake conduit, wherein the control circuit is configured to produce the specific humidity value as a function of the temperature signal, the pressure signal and the relative humidity signal. For example, the control circuit may include an open-loop control strategy configured to produce an error value as a difference between the target humidity value and the specific humidity value, and to produce the at least one control signal as a function of at least the error value. The system may further include a mass air flow sensor producing a mass air flow signal indicative of the mass flow of air past the peltier junction device, wherein the open-loop control strategy is further configured to produce the at least one control signal as a function of a product of the error value and the mass air flow signal.

In either case, the system may further include a turbocharger having a compressor defining a compressor inlet configured to receive ambient air and a compressor outlet fluidly coupled to the opposite end of the intake conduit, wherein the peltier junction device is positioned downstream of the compressor outlet. Alternatively, the peltier junction device may be positioned upstream of the compressor inlet.

The peltier junction device may define a cooling side and a heating side, and the system may further include a first heat transfer structure mounted to the cooling side of the peltier junction device and disposed in the flow path of the ambient air supplied by the intake conduit to the intake manifold, with the cooling side of the peltier junction device and the first heat transfer structure cooperating to cool, and therefore condense moisture from, the ambient air supplied by the intake conduit to the intake manifold. The system may further include a second heat transfer structure mounted to the heating side of the peltier junction device and configured to direct heat away from the heating side of the peltier junction device.

The intake conduit may include first and second separate airflow passages with the peltier junction device mounted therebetween with the cooling side in fluid communication with the first airflow passage and the heating side in fluid communication with the second airflow passage. The first airflow passage may have one end coupled to the intake manifold downstream of the peltier junction device and an opposite end configured to receive ambient air upstream of the peltier junction device, and the second airflow passage may have one end configured to receive ambient air upstream of the peltier junction device and an opposite end vented to ambient downstream of the peltier junction device.

Alternatively, the peltier junction device may be mounted to the intake conduit with the cooling side in fluid communication with ambient air flowing through the intake manifold and with the heating side in fluid communication with ambient.

The system may further include a moisture collection structure configured to collect moisture condensed from the ambient air supplied by the intake conduit to the intake manifold and to direct the collected moisture away from the ambient air supplied by the intake conduit to the intake manifold. The moisture collection structure may be configured to direct the collected moisture from the cooling side of the peltier junction device to the heating side of the pelter junction device. The moisture collection structure may extend from the first heat transfer structure at least to the second heat transfer structure to direct the collected moisture from the first heat transfer structure toward the second heat transfer structure. The moisture collection structure may comprise at least one moisture absorbent member mounted to the first heat transfer structure and extending through the second heat transfer structure, the moisture absorbent member absorbing moisture condensed by the cooperation of the cooling side of the peltier junction device and the first heat transfer member and directing the absorbed moisture toward the second heat transfer structure for evaporation by the ambient air flowing past the second heat transfer structure.

An intake air dehumidification system for an internal combustion engine may comprise an intake conduit having one end coupled to an intake manifold of the engine and an opposite end configured to receive ambient air and a peltier junction device responsive to a number of control signals to cool, and therefore condense moisture from, ambient air supplied by the intake conduit to the intake manifold. Means may be included for determining a specific humidity value corresponding to specific humidity of the ambient air downstream of the peltier junction device, and a control circuit may be provided to produce the number of control signals as a function of the specific humidity value to maintain the specific humidity of the ambient air supplied to the intake manifold near a target humidity value.

The control circuit may include means for producing an error value as a difference between the target humidity value and the specific humidity value, and means for producing the number of control signals in a manner that minimizes the error value. The means for producing the number of control signals in a manner that minimizes the error value may include a controller producing a number of pulse width modulated output signals, and a driver circuit responsive to the number of pulse width modulated output signals to produce the number of control signals. The controller may control the pulse widths of the output signals as a function of the error signal to control the on-times of a corresponding number of peltier junction elements forming the peltier junction device.

The peltier junction device may include a number of peltier junction elements. The means for producing the number of control signals in a manner that minimizes the error value may include a table mapping error values to subset values corresponding to subsets of the number of peltier junction elements, means responsive to the subset values to enable corresponding subsets of the number of peltier junction elements for operation, and a driver circuit supplying the control signals to each of the enabled peltier junction elements to activate each of the enabled peltier junction elements.

An intake air dehumidification system for an internal combustion engine may comprise an intake conduit having one end coupled to an intake manifold of the engine and an opposite end configured to receive ambient air, and a peltier junction device responsive to a number of control signals to cool, and therefore condense moisture from, ambient air supplied by the intake conduit to the intake manifold. Means may be provided for determining a specific humidity value corresponding to specific humidity of the ambient air upstream of the peltier junction device, and a mass air flow sensor may be provided for producing a mass air flow signal indicative of the mass flow of air past the peltier junction device. A control circuit may be included to produce the number of control signals as a function of the specific humidity value and the mass airflow signal to maintain the specific humidity of the ambient air supplied to the intake manifold near a target humidity value.

The control circuit may include means for producing an error value as a difference between the target humidity value and the specific humidity value, and means for producing the number of control signals as a function of a product of the error value and the mass air flow signal.

The peltier junction device includes a number of peltier junction elements, and the means for producing the number of control signals in a manner that minimizes the error value may include a table mapping error values to subset values corresponding to subsets of the number of peltier junction elements, means responsive to the subset values to enable corresponding subsets of the number of peltier junction elements for operation, and a driver circuit supplying the control signals to each of the enabled peltier junction elements to activate each of the enabled peltier junction elements.

These and other objects of the disclosure will become more apparent from the following description of the illustrative embodiments.

DESCRIPTION OF THE ILLUSTRATIVE EMBODIMENTS

Figure 1:
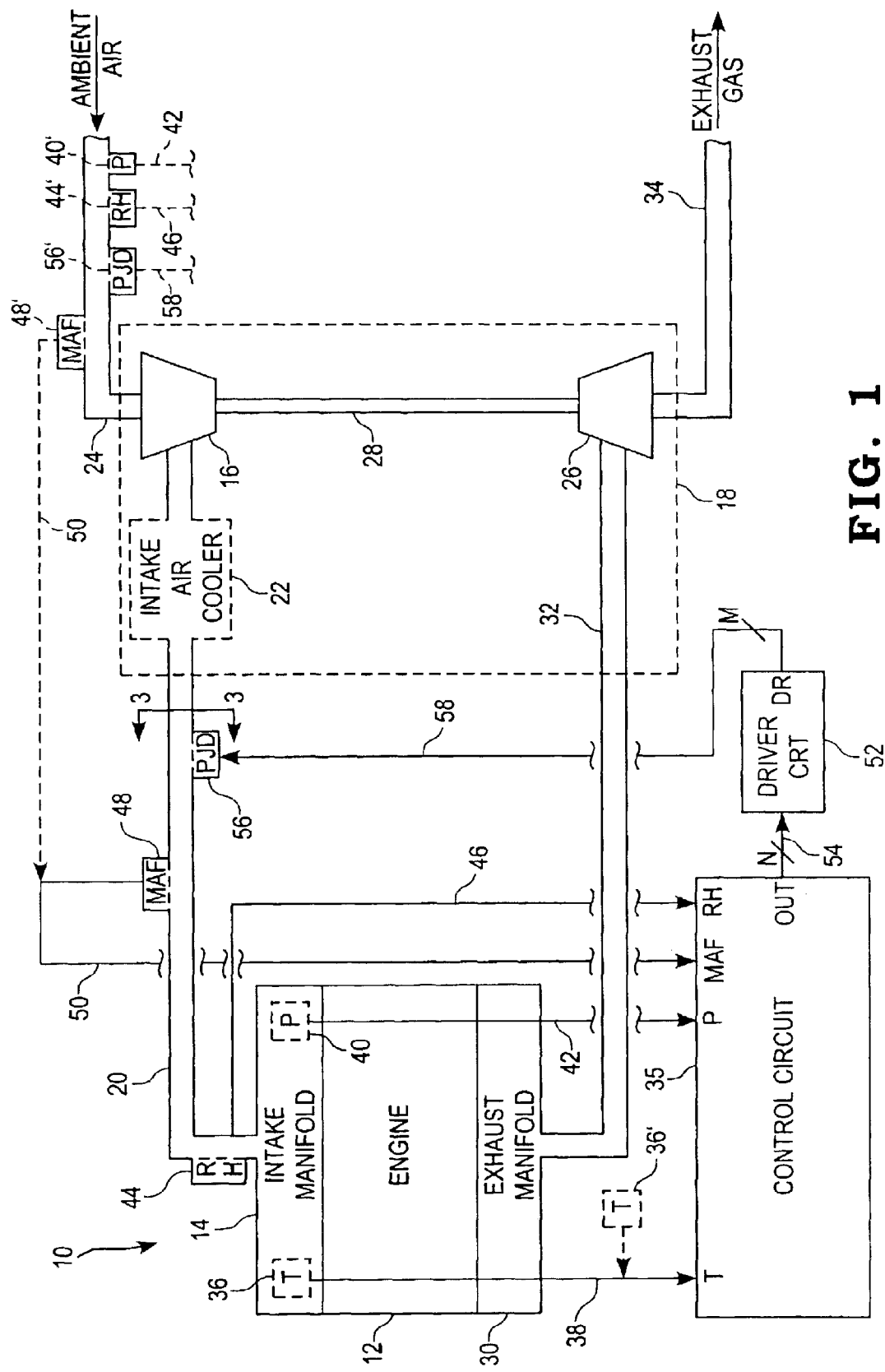
FIG. 1 is a diagram of one illustrative embodiment of an intake air dehumidification system for an internal combustion engine.

For the purposes of promoting an understanding of the principles of this disclosure, reference will now be made to a number of illustrative embodiments shown in the drawings and specific language will be used to describe the same. It will nevertheless be understood that no limitation of the scope of the claims appended hereto is thereby intended.

Referring now to FIG. 1, one illustrative embodiment of an intake air dehumidification system 10 for an internal combustion engine 12 is shown. System 10 includes an internal combustion engine 12 having an intake manifold 14 fluidly coupled to one end of an air intake manifold 20 having an opposite end configured to receive ambient air. An exhaust manifold 30 of engine 12 is fluidly coupled to one end of an exhaust manifold 32 having an opposite end configured to expel engine exhaust gas to ambient. In the illustrated embodiment, the opposite end of intake manifold 20 is fluidly coupled to an outlet of a turbocharger compressor 16, forming part of a turbocharger 18, via intake conduit 20. An inlet of compressor 16 is fluidly coupled to ambient via conduit 24. Optionally, as shown in phantom in FIG. 1, turbocharger 18 may include an intake air cooler 22 disposed in-line with conduit 24 for cooling intake air provided by compressor 16. Turbocharger 18 further includes a turbine 26 that is rotatably coupled to compressor 16 via shaft 28 and that has a turbine inlet fluidly coupled to the opposite end of exhaust conduit 32. An exhaust gas outlet of turbine 26 is fluidly coupled to ambient via conduit 34.

The turbocharger turbine 26 includes a turbine wheel (not shown) that is rotated by exhaust gases flowing from exhaust manifold 30 through exhaust conduit 34. The turbine wheel is mechanically coupled to shaft 28 such that rotation of the turbine wheel is transferred through shaft 28 to a compressor wheel (not shown) of turbocharger compressor 16. In a conventional manner, rotation of the compressor wheel increases the amount of air drawn through conduit 24 and provided to intake manifold 14 via conduit 20.

In an alternate, non-turbocharged embodiment of engine 12, turbocharger 18 is omitted, and conduits 20 and 24 are merged into a single conduit supplying ambient air directly to intake manifold 14. Conduits 32 and 34 are likewise merged into a single conduit configured to expel engine exhaust gas from exhaust manifold 30 directly to ambient.

System 10 includes a control circuit 35 that is, in one embodiment, microprocessor-based and generally operable to control and manage the overall operation of engine 12. In this embodiment, control circuit 35 may be a known control unit sometimes referred to as an electronic or engine control module (ECM), electronic or engine control unit (ECU) or the like. In an alternative embodiment, control circuit 35 may be any general purpose or application specific control circuit capable of operation as described hereinafter. In any case, control circuit 35 includes conventional memory as well as a number of inputs and outputs for interfacing with various sensors and systems coupled to engine 12. In at least one embodiment, for example, intake manifold 14 includes an intake manifold temperature sensor 36 in fluid communication therewith and electrically connected to a temperature input, T, of control circuit 35 via signal path 38 as shown in FIG. 1. Temperature sensor 36 may be of known construction and is operable to produce a temperature signal on signal path 38 indicative of the temperature of air entering intake manifold 14. In one or more alternative embodiments, the temperature input, T, of control circuit 35 is connected via signal path 38 to a suitably positioned ambient temperature sensor 36', as shown in phantom in FIG. 1, wherein sensor 36' is of known construction and operable to produce a temperature signal on signal path 38 indicative of ambient temperature.

System 10 further includes a pressure sensor 40 of known construction and electrically connected to a pressure input, P, of control circuit 35 via signal path 42. In the embodiment shown in FIG. 1, pressure sensor 40 is disposed in fluid communication with intake manifold 14, and is operable to produce a pressure signal indicative of air pressure within the intake manifold 14. Alternatively, sensor 40 may be positioned in fluid communication with intake conduit 20, wherein the pressure signal produced by sensor 40 is indicative of the air pressure within the intake conduit 20, which corresponds to the pressure of air entering the intake manifold 14. In one or more alternative embodiments, the pressure input, P, of control circuit 35 is connected via signal path 42 to an ambient pressure sensor 40', as shown in phantom in FIG. 1, wherein sensor 40' is of known construction and operable to produce a pressure signal on signal path 42 indicative of the pressure of ambient air entering conduit 24. In such one or more embodiments, sensor 40' may be positioned in fluid communication with conduit 24 as illustrated in phantom in FIG. 1, or may alternatively be otherwise suitably positioned relative to system 10 to produce a pressure signal on signal path 42 indicative of the pressure of ambient air entering conduit 24.

System 10 further includes a relative humidity sensor 44 of known construction and electrically connected to a relative humidity input, RH, of control circuit 35 via signal path 46. In at least one embodiment, relative humidity sensor 44 is disposed in fluid communication with intake conduit 20, and in embodiments including turbocharger 18 with intake air cooler 22, it is desirable to locate sensor 44 between intake air cooler 22 and intake manifold 14 as illustrated in FIG. 1. The relative humidity sensor 44 is operable to produce a humidity signal on signal path 46 indicative of the relative humidity of air entering the intake manifold 14. In one or more alternative embodiments, the relative humidity input, RH, of control circuit 35 is connected via signal path 46 to an ambient relative humidity sensor 44', as shown in phantom in FIG. 1, wherein sensor 44' is of known construction and operable to produce a relative humidity signal on signal path 46 indicative of the relative humidity of ambient air entering conduit 24. In such one or more embodiments, sensor 44' may be positioned in fluid communication with conduit 24 as illustrated in phantom in FIG. 1, or may alternatively be otherwise suitably positioned relative to system 10 to produce a relative humidity signal on signal path 42 indicative of the relative humidity of ambient air entering conduit 24.

In at least one embodiment, system 10 further includes a mass airflow sensor 48 of known construction and electrically connected to a mass airflow input, MAF, of control circuit 35 via signal path 50. In the illustrated embodiment, mass air flow sensor 48 is disposed in fluid communication with intake conduit 20, and in embodiments including turbocharger 18 with intake air cooler 22, it is desirable to locate sensor 48 between intake air cooler 22 and intake manifold 14 as illustrated in FIG. 1. The mass air flow sensor 48 is operable to produce a mass air flow signal on signal path 50 indicative of the mass flow rate of air flowing through the intake conduit 20, and more particularly the mass flow rate of air flowing past the peltier junction unit 56 (which will be described in greater detail hereinafter). In one or more alternative embodiments, the mass air flow input, MAF, of control circuit 35 is connected via signal path 46 to a mass air flow sensor 48', positioned in fluid communication with conduit 24 as shown in phantom in FIG. 1, wherein sensor 48' is of known construction and operable to produce a mass air flow signal on signal path 50 indicative of the mass flow rate of air entering conduit 24.

Control circuit 35 further includes an output, OUT, connected via a number, N, of signal paths 54 to a driver circuit 52 of known construction. A driver output, DR, of the driver circuit 52 is, in turn, connected via a number, M, of signal paths 58 to a peltier junction unit 56. N and M may each be any positive integer. In at least one embodiment, peltier junction unit 56 is positioned in fluid communication with intake conduit 20 as illustrated in FIG. 1. In one or more alternative embodiments, a peltier junction unit 56' is positioned in fluid communication with conduit 24, and connected to driver circuit 52 via "M" signal paths 58. As will be described in greater detail hereinafter, control circuit 35 is configured to control, via driver circuit 52, the peltier junction unit 56 (or 56'), as a function of various combinations of the input signals to control circuit 35, in a manner that controls the specific humidity of the ambient air entering the intake manifold 14 near a target humidity value.

Figure 2:
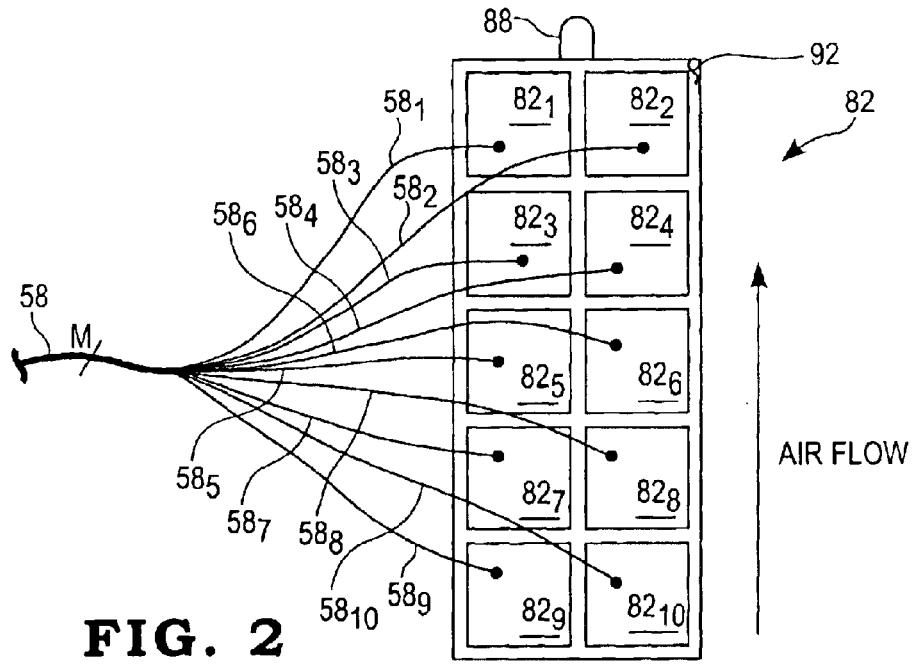
FIG. 2 is a top plan view of one illustrative embodiment of a peltier junction device including a number of peltier junction elements.

Referring now to FIG. 2, one illustrative embodiment of a peltier junction device 82 is shown. In the embodiment of system 10 illustrated in FIG. 1, the peltier junction unit 56 (or 56') includes a peltier junction device, such as device 82 illustrated in FIG. 2. Peltier junction device 82 includes a number of peltier junction elements, and in the embodiment illustrated in FIG. 2, device 82 includes ten such peltier junction elements $82_1$–$82_2$. It will be understood, however, that peltier junction device 82 may alternatively include more or fewer peltier junction elements, and the number of such peltier junction elements included in device 82 will typically depend upon the application of system 10. In the illustrated embodiment, each of the peltier junction elements $82_1$–$82_{10}$ are electrically connected to a corresponding dedicated signal path $58_1$–$58_{10}$ forming part of signal path 58, so that M=10 in this example. Those skilled in the art will recognize, however, that signal path 58 may alternatively be arranged to connect one or more sets or groups of the peltier junction elements $82_1$–$82_{10}$ in parallel, so that one or more corresponding "banks" of peltier junction elements may be operably controlled via a common drive signal produced by driver circuit 52.

Peltier junction elements, such as any of the peltier junction elements $82_1$–$82_{10}$ illustrated in FIG. 2, are known structures that comprise a number of interconnected thermoelements to form a first surface that acts as a cooler and a second opposite surface that acts as a heater. A typical peltier junction element includes a number of P-type semiconductor devices and N-type semiconductor devices that are alternately arranged and interconnected to form a first surface that serves as a cooling plane and a second opposite surface that serves as a heating plane. In cooling operation, current from an energy source flows from the N-type semiconductor devices to the P-type semiconductor devices, so that electrons flow from a P-type lower energy level to a N-type higher energy level. As a result, the temperature of the medium, e.g., air, along the cooling plane of the peltier junction element decreases as thermal energy in the medium along the cooling plane is absorbed by the element. In like manner, current flows from the P-type semiconductor devices to the N-type semiconductor devices during heating operation, so that electrons flow from a N-type higher energy level to a P-type lower energy level. Consequently, the temperature of the medium, e.g., air, along the heating plane of the peltier junction element increases as thermal energy released by the element radiates to the medium along the heating plane.

Cooling or heating operation by a peltier junction element can thus be controlled by varying the magnitude and polarity of the current supplied to the element. In air media, peltier junction elements can accordingly be controlled to act as an air conditioner (cooler) and/or heater depending upon the polarity of current supplied thereto. In the embodiment illustrated in FIG. 2, a number of peltier junction elements, e.g., $82_1$–$82_{10}$, are positioned in a common orientation to define a peltier junction device 82 having a cooling surface 92 and an opposite heating surface 94 (as illustrated in FIGS. 3A and 3C).

It is generally known that as air is cooled, its moisture carrying capacity decreases, and its specific humidity level therefore likewise decreases. The operation of cooling warm, moist ambient air entering the intake conduit 20 results in condensation of water from the ambient air so that the specific humidity of the resultant air supplied to the intake manifold 14 can be controlled, and in the illustrated embodiment a moisture absorbent member 88 is positioned in contact with at least a portion of the cooling surface 92 of the peltier junction device 82 to absorb such moisture condensed from the ambient air along and about surface 92. In one embodiment, moisture absorbent member 88 is formed of a water-absorbing fabric, such as cotton or the like, although those skilled in the art will recognize that other water-absorbing materials and/or material compositions may alternatively be used. Alternatively still, moisture absorbent member 88 may be replaced with a fluid funneling or routing structure configured to direct fluid away from the cooling surface 92 to an area where the water may be evaporated, discharged or otherwise directed away from the cooling surface 92 and/or air cooling region about surface 92.

Figure 3A:
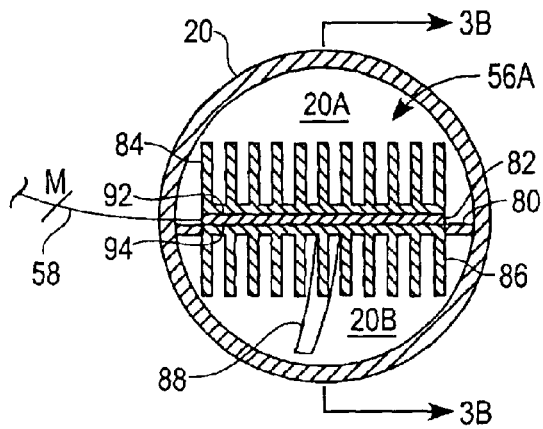
FIG. 3A is a cross-sectional view of one illustrative embodiment of the peltier junction unit and intake conduit arrangement of FIG. 1, viewed along section lines 3—3.
Figure 3C:
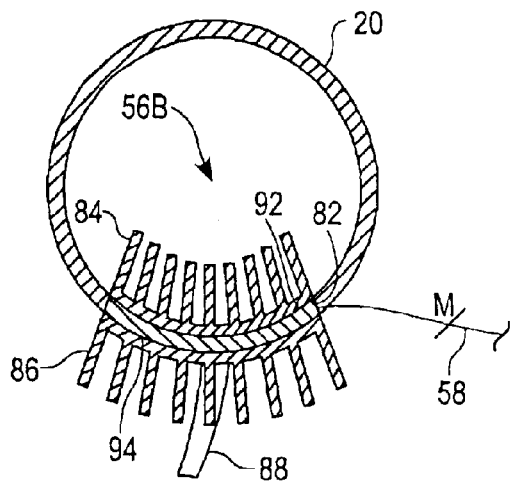
FIG. 3C is a cross-sectional view of another illustrative embodiment of the peltier junction unit and intake conduit arrangement of FIG. 1, viewed along section lines 3—3.
Figure 3B:
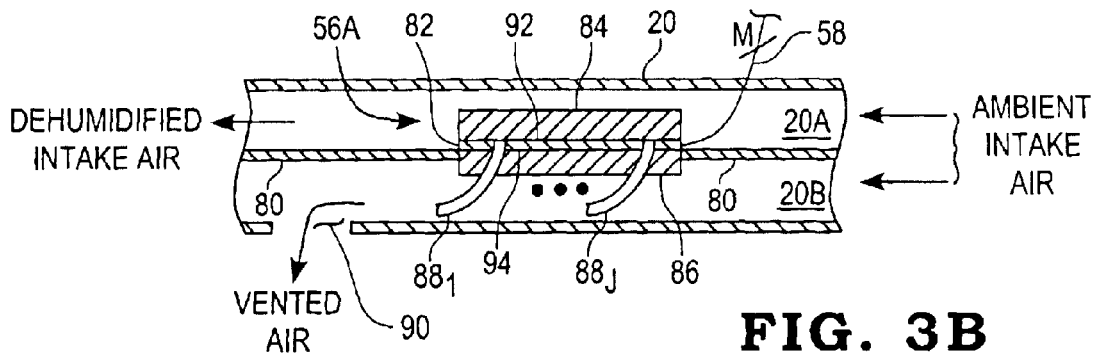
FIG. 3B is a side elevational and cross-sectional view of the peltier junction unit and intake conduit arrangement illustrated in FIG. 3A, viewed along section lines 3B—3B.

Referring now to FIG. 3A, a cross-sectional view of one embodiment 56A of the peltier junction unit 56 and intake conduit 20 arrangement is shown. In embodiments wherein the peltier junction unit 56' is alternatively disposed in fluid communication with conduit 24, as shown in phantom in FIG. 1, it will be understood that references to the structural modifications to, and operation of, intake conduit 20 will instead pertain to conduit 24. In any case, as illustrated in FIG. 3A, the intake conduit 20 is bifurcated via a wall member 80 into a first air intake conduit passage 20A and a second intake conduit passage 20B. In this embodiment, a peltier junction device, such as peltier junction device 82, is mounted to the wall member 80 such that the cooling side 92 is in fluid communication with the first intake conduit passage 20A and the heating side 94 is in fluid communication with the second intake conduit passage 20B, with passages 20A and 20B fluidly isolated from each other. As illustrated in FIG. 3B, one end of the first intake conduit passage 20A is coupled to the intake manifold 14 downstream of the peltier junction device 82, and an opposite end is configured to receive ambient intake air upstream of the peltier junction device 82. The second intake conduit passage 20B has one end configured to receive ambient intake air upstream of the peltier junction device 82, and an opposite end vented to ambient, via vent 90, downstream of the peltier junction device 82.

The cooling side of the peltier junction device 82 is operable, as will be described in greater detail hereinafter, to cool, and therefore condense moisture from, the ambient air flowing through passage 20A. The heating side of the peltier junction device 82 is likewise operable to heat ambient air flowing through passage 20B. Moisture collected by the one or more moisture collection members 88 from the cooling side of the peltier junction device 82 is directed into passage 20B where such moisture is evaporated by the heated ambient air flowing therethrough.

In some embodiments, the peltier junction unit 56A is formed as just described. In other embodiments, it may be desirable to attach or mount one or more heat transfer structures to the cooling and/or heating sides, 92 and 94 respectively, of the peltier junction device 82 to form peltier junction unit 56A. In embodiment illustrated in FIGS. 3A and 3B, for example, a first heat transfer structure 84 is mounted to the cooling side 92 of the peltier junction device 82 such that structure 84 is disposed in the flow path of the ambient air flowing through intake conduit passage 20A. The heat transfer structure 84 and cooling side 92 of the peltier junction device 82 cooperate to cool, and therefore condense moisture from, the ambient air supplied by the intake conduit 20 to the intake manifold 14. In the illustrated embodiment, the first heat transfer structure 84 defines a number of fins extending longitudinally in the direction of airflow, although other heat transfer configurations are contemplated. In the embodiment illustrated in FIGS. 3A and 3B, a second heat transfer structure 86 is mounted to the heating side 94 of the peltier junction device 82 such that structure 86 is disposed in the flow path of the ambient air flowing through intake conduit passage 20B. The heat transfer structure 86 and heating side 94 of the peltier junction device 82 cooperate to heat the ambient air flowing through passage 20B.

In the illustrated embodiment, one or more moisture collection members $88_1$–$88_J$ are mounted to the first heat transfer structure 84, and extend through and past the second heat transfer structure 86 into passage 20B. The one or more moisture collection members $88_1$–$88_J$ direct moisture condensed by the cooperation of the cooling side 92 of the peltier junction device 82 and the first heat transfer structure 84 toward the heating side 94 of the peltier junction device 82 and the second heat transfer structure 86. While one or more moisture collection members $88_1$–$88_J$ are illustrated and described with respect to FIGS. 2–3C for directing moisture condensed from the ambient air supplied by the intake conduit 20 to the intake manifold 14, system 10 may alternately or additionally include a moisture collection structure configured to dissipate or direct moisture condensed from the ambient air supplied by the intake conduit 20 to the intake manifold 14 away from the cooling side 92 of the peltier junction device 82. Formation and configuration of such an alternate moisture collection structure would be a mechanical step for a skilled artisan. In one embodiment, for example, a moisture collection structure may be a funneling structure configured to direct the collected moisture from the cooling side 92 of the peltier junction device 82 to the heating side of the peltier junction device 82 or to ambient. Other moisture dissipating, directing and/or collecting structures will occur to those skilled in the art, and any such structure is intended to fall within the scope of the claims appended hereto.

Referring now to FIG. 3C, a cross-sectional view of an alternate embodiment 56B of the peltier junction unit 56 and intake conduit 20 arrangement is shown. In embodiments wherein the peltier junction unit 56' is alternatively disposed in fluid communication with conduit 24, as shown in phantom in FIG. 1, it will be understood that references to the structural modifications to, and operation of, intake conduit 20 will instead pertain to conduit 24. In any case, the peltier junction unit 56B illustrated in FIG. 3C may be identical to any one or more of the peltier junction unit embodiments 56A illustrated in FIGS. 3A and 3B, except for the location of unit 56B relative to the intake conduit 20. In the embodiment illustrated in FIG. 3C, for example, the intake conduit 20 is not bifurcated and the peltier junction device 82 is instead mounted directly to the intake conduit 20 such that the cooling side 92 is in fluid communication with the interior of the intake conduit 20 and the heating side 94 is in fluid communication with the ambient air about conduit 20.

The structure and operation of peltier junction unit 56B is otherwise identical to that described with respect to FIGS. 3A and 3B.

Figure 4:
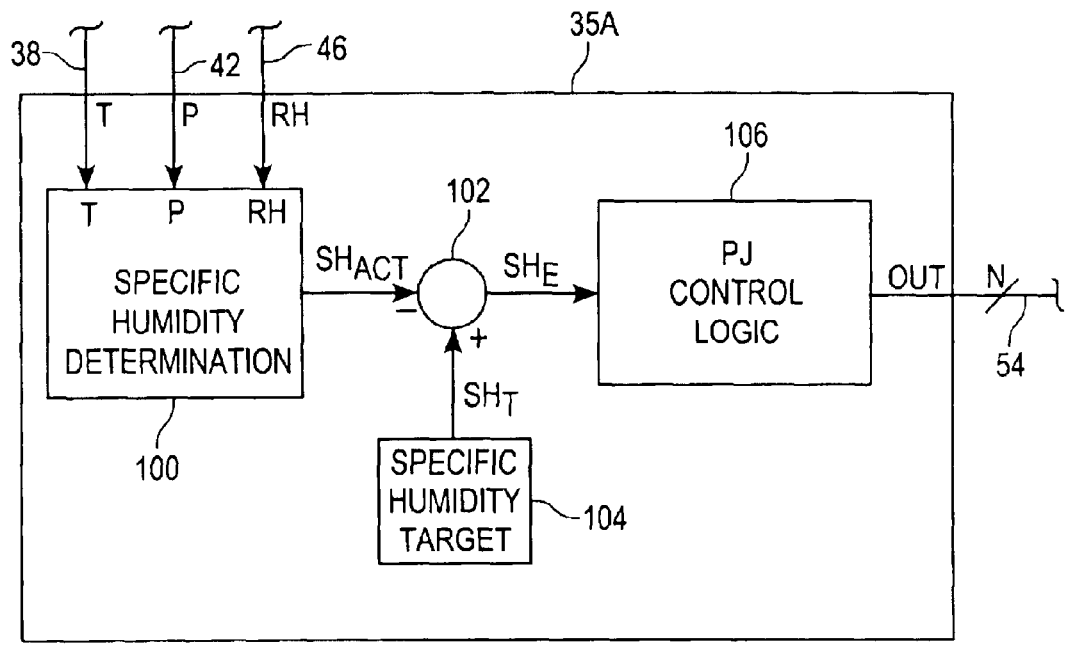
FIG. 4 is a diagram of one illustrative embodiment of a control strategy implemented by the control circuit of FIG. 1 to control the humidity of intake air supplied to the engine.

Referring now to FIG. 4, a diagram of one illustrative embodiment of a control strategy 35A implemented by the control circuit 35 of FIG. 1 to control the humidity of intake air supplied to the engine 12 is shown. Control strategy 35A may be operated in a closed-loop mode or in an open-loop mode. In closed-loop mode, at least the intake air temperature sensor, intake air pressure sensor and relative humidity sensor are located downstream of the peltier junction unit, and the intake air temperature sensor accordingly corresponds in FIG. 1 to sensor 36, the intake air pressure sensor corresponds to sensor 40 and the relative humidity sensor corresponds to sensor 44. The peltier junction unit corresponds to either unit 56 or unit 56'. In open loop mode, the intake air temperature sensor, intake air pressure sensor and relative humidity sensor may be located upstream or downstream of the peltier junction unit, and the intake air temperature sensor may accordingly correspond to either sensor 36 or 36', the intake air pressure sensor may correspond to either sensor 40 or 40' and the relative humidity sensor may correspond to either sensor 44 or 44'. In any case, control strategy 35A includes a specific humidity determination block 100 receiving as input signals the temperature signal on signal path 38, the pressure signal on signal path 42 and the relative humidity signal on signal path 46, and producing as an output an actual specific humidity value, $SH_{ACT}$, corresponding to the actual specific humidity of intake air entering the intake manifold 14. Block 100 is responsive to the intake air temperature signal produced by sensor 36, the intake air pressure signal produced by sensor 40 and the relative humidity signal produced by sensor 44 to compute the actual specific humidity value, $SH_{ACT}$, using known relationships therebetween.

The specific humidity value, $SH_{ACT}$, is supplied to a subtraction input of a summation node 102 having an addition input receiving a specific humidity target value, $SH_T$, produced by a specific humidity target block 104. In one embodiment, the specific humidity target value, $SH_T$, is a calibratible, static value stored in memory, although $SH_T$ may alternatively be a dynamic value computed as a function of one or more engine operating conditions or supplied by an electronic system external to system 10. In any case, $SH_T$ may take on any desired value, with one exemplary value being 75 grains. The output of the summation node 102 is a specific humidity error value, $SH_E$, that is the difference between the actual specific humidity value, $SH_{ACT}$, and the target specific humidity value, $SH_T$. The specific humidity error value, $SH_E$, is supplied as an input to a peltier junction control logic block 106 having an output corresponding to output OUT of control circuit 35.

In one embodiment, the peltier junction control logic block 106 is a known controller operable to produce the "N" output signals on signal paths 54 in a manner that minimizes the specific humidity error value, $SH_E$. In this embodiment, the controller may be configured to activate any one or combination of peltier junction elements comprising the peltier junction device 82, and/or to control the activation times of the one or more peltier junction elements as a function of $SH_E$. In one specific embodiment, for example, the controller is operable to produce a pulse-width modulated (PWM) signal on any one or more of the "N" output signal paths 54 to control the number and activation durations of the "N" peltier junction elements comprising peltier junction device 82. Such a controller may be, for example, a known proportional-integral-derivative (PID) controller, proportional-integral (PI) controller, or the like, or may alternatively be any known controller operable to produce the "N" output signals in a manner that minimizes $SH_E$.

Figure 5:
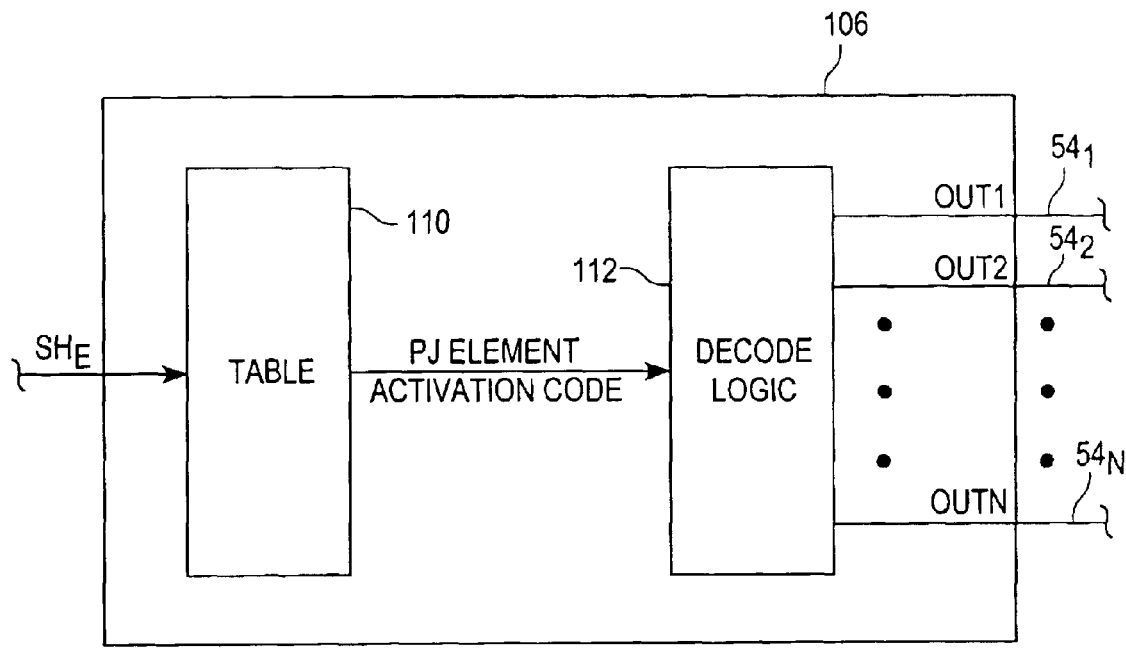
FIG. 5 is a diagram of one illustrative embodiment of the PJ control logic block of FIG. 4.

In an alternate embodiment, the peltier junction control logic block 106 includes control logic operable to selectively control one or more of the number of peltier junction elements comprising the peltier junction device 82 as a function of $SH_E$. One illustrative implementation of such a peltier junction logic block 106 is illustrated in FIG. 5 and includes a table 110 receiving the specific humidity error value, $SH_E$. The output of table 110 is a peltier junction element activation code, and is supplied to the input of a decode logic block 112 operable to decode the peltier junction element activation code and produce corresponding output signals on one or more of the signal paths $54_1$–$54_N$.

In one embodiment, table 110 is a one-dimensional table mapping specific humidity error values, $SH_E$, to corresponding peltier junction element activation codes, wherein each of the peltier junction element activation codes in this embodiment correspond to a selected one, or combination of, peltier junction elements, e.g., $82_1$–$82_N$ to be activated. The decode logic block 112 is configured in this embodiment to decode the various peltier junction activation codes and activate corresponding ones, or combinations of, the various peltier junction elements comprising the peltier junction device 82. In this embodiment, the peltier junction control logic block 106 is thus operable to minimize the specific humidity error value, $SH_E$, by selectively activating one or more of the various peltier junction elements comprising the peltier junction device 82.

In an alternate embodiment, table 110 is a one-dimensional table mapping specific humidity error values, $SH_E$, to corresponding peltier junction element activation codes, wherein each of the peltier junction element activation codes in this embodiment include information corresponding to a selected one, or combination of, peltier junction elements, e.g., $82_1$–$82_N$ to be activated as well as an on-time duration or duty cycle of each selected element. The decode logic block 112 is configured in this embodiment to decode the various peltier junction activation codes and activate corresponding ones, or combinations of, the various peltier junction elements comprising the peltier junction device 82. In this embodiment, the peltier junction control logic block 106 is thus operable to minimize the specific humidity error value, $SH_E$, by selectively controlling the activation and on-times one or more of the various peltier junction elements comprising the peltier junction device 82.

Other control strategies for the peltier junction control logic block 106 will occur to those skilled in the art, and any such other peltier junction control logic strategies are intended to fall within the scope of the claims appended hereto.

Figure 6:
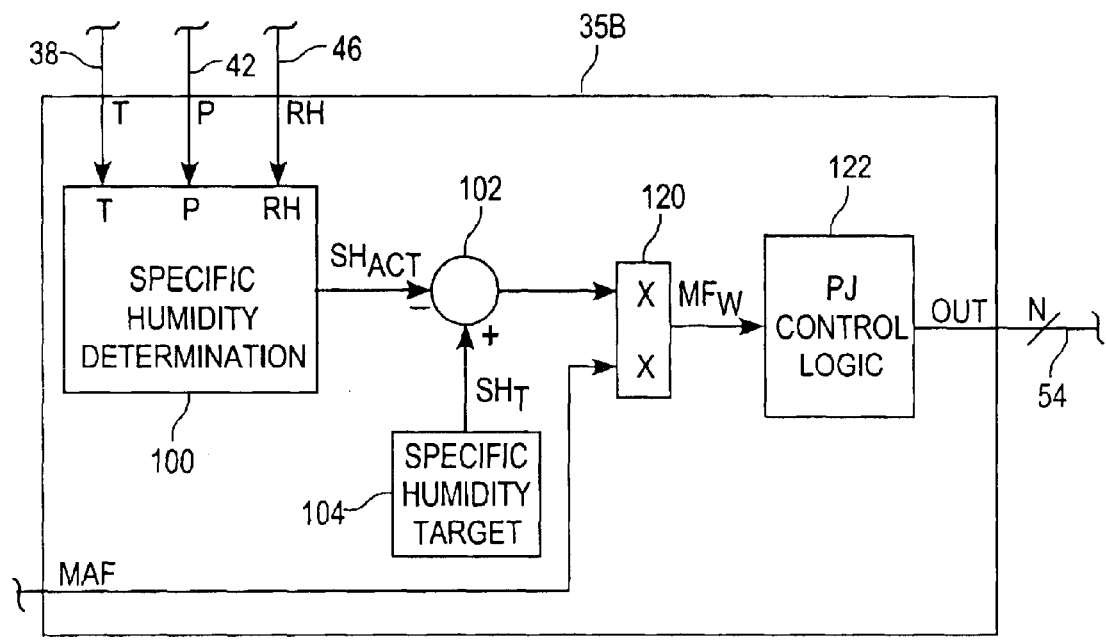
FIG. 6 is a diagram of one illustrative embodiment of an alternate control strategy implemented by the control circuit of FIG. 1 to control the humidity of intake air supplied to the engine.

Referring now to FIG. 6, a diagram of one illustrative embodiment of another control strategy 35B that may be implemented by the control circuit 35 of FIG. 1 to control the humidity of intake air supplied to the engine 12 is shown. Control strategy 35B may be operated in a closed-loop mode or in an open-loop mode. In closed-loop mode, at least the intake air temperature sensor, intake air pressure sensor and relative humidity sensor are located downstream of the peltier junction unit, and the intake air temperature sensor accordingly corresponds in FIG. 1 to sensor 36, the intake air pressure sensor corresponds to sensor 40, the relative humidity sensor corresponds to sensor 44. The mass airflow sensor 48 or 48' is positioned to produce a signal indicative of the mass flow rate of air past the peltier junction unit. The peltier junction unit corresponds to either unit 56 or unit 56', and with unit 56 the mass airflow sensor thus corresponds to sensor 48 and with unit 56' the mass airflow sensor corresponds to sensor 48'. In open loop mode, the intake air temperature sensor, intake air pressure sensor and relative humidity sensor may be located upstream or downstream of the peltier junction unit, and the intake air temperature sensor may accordingly correspond to either sensor 36 or 36', the intake air pressure sensor may correspond to either sensor 40 or 40' and the relative humidity sensor may correspond to either sensor 44 or 44'. In any case, control strategy 35B includes a specific humidity determination block 100 receiving as input signals the temperature signal on signal path 38, the pressure signal on signal path 42 and the relative humidity signal on signal path 46, and producing as an output an actual specific humidity value, $SH_{ACT}$, corresponding to the actual specific humidity of intake air entering the intake manifold 14. Block 100 is responsive to the intake air temperature signal produced by sensor 36, the intake air pressure signal produced by sensor 40 and the relative humidity signal produced by sensor 44 to compute the actual specific humidity value, $SH_{ACT}$, using known relationships therebetween.

The specific humidity value, $SH_{ACT}$, is supplied to a subtraction input of a summation node 102 having an addition input receiving a specific humidity target value, $SH_T$, produced by a specific humidity target block 104. In one embodiment, the specific humidity target value, $SH_T$, is a calibratible, static value stored in memory, although $SH_T$ may alternatively be a dynamic value computed as a function of one or more engine operating conditions or supplied by an electronic system external to system 10. In any case, $SH_T$ may take on any desired value, with one exemplary value being 75 grains. The output of the summation node 102 is a specific humidity error value, $SH_E$, that is the difference between the actual specific humidity value, $SH_{ACT}$, and the target specific humidity value, $SH_T$. The specific humidity error value, $SH_E$, is supplied to one input of a multiplication block 120 having a second input receiving the mass air flow signal, MAF, corresponding to the mass flow rate of air past the peltier junction unit. The output of multiplication block 120 is the mass flow rate of water, $MF_W$, corresponding to the mass flow rate of water to be condensed out of the ambient air supplied by the intake conduit 20 to the intake manifold 14. The water mass flow rate value, $MF_W$, is supplied as an input to a peltier junction control logic block 122 having an output corresponding to output OUT of control circuit 35.

In one embodiment, the peltier junction control logic block 122 is a known controller operable to produce the "N" output signals on signal paths 54 in a manner that minimizes the water mass flow rate value, $MF_W$. In this embodiment, the controller may be configured to activate any one or combination of peltier junction elements comprising the peltier junction device 82, and/or to control the activation times of the one or more peltier junction elements as a function of $SH_E$. In one specific embodiment, for example, the controller is operable to produce a pulse-width modulated (PWM) signal on any one or more of the "N" output signal paths 54 to control the number and activation durations of the "N" peltier junction elements comprising peltier junction device 82. Such a controller may be, for example, a known proportional-integral-derivative (PID) controller, proportional-integral (PI) controller, or the like, or may alternatively be any known controller operable to produce the "N" output signals in a manner that minimizes $SH_E$.

Figure 7:
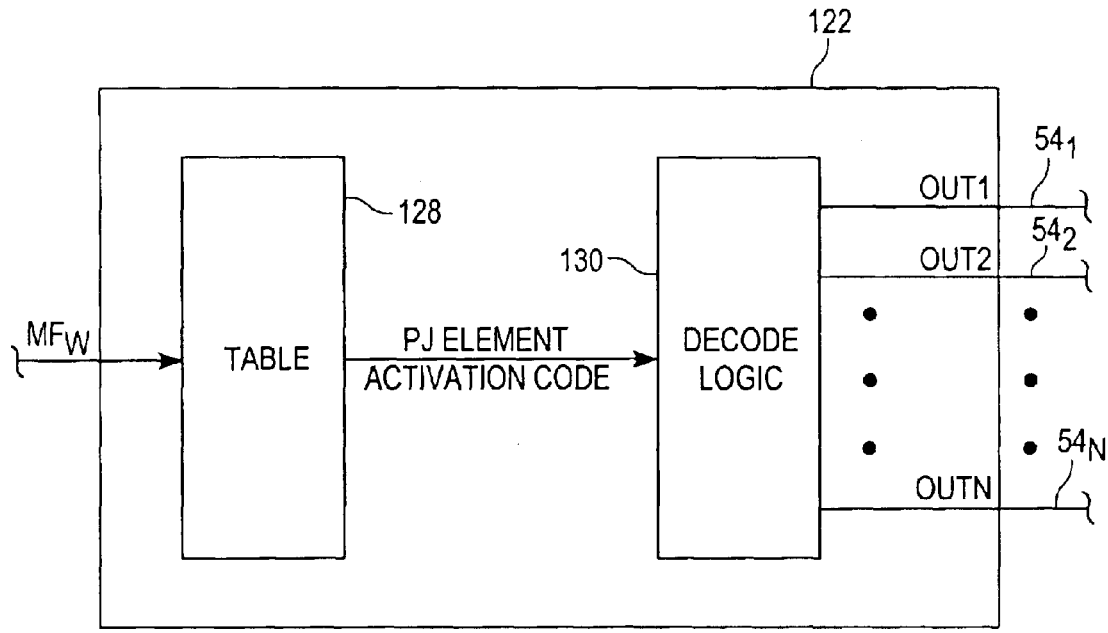
FIG. 7 is a diagram of one illustrative embodiment of the PJ control logic block of FIG. 6.

In an alternate embodiment, the peltier junction control logic block 122 includes control logic operable to selectively control one or more of the number of peltier junction elements comprising the peltier junction device 82 as a function of $MF_W$. One illustrative implementation of such a peltier junction logic block 122 is illustrated in FIG. 7 and includes a table 128 receiving the water mass flow rate values, $MF_W$. The output of table 128 is a peltier junction element activation code, and is supplied to the input of a decode logic block 130 operable to decode the peltier junction element activation code and produce corresponding output signals on one or more of the signal paths $54_1$–$54_N$.

In one embodiment, table 128 is a one-dimensional table mapping water mass flow rate values, $MF_W$, to corresponding peltier junction element activation codes, wherein each of the peltier junction element activation codes in this embodiment correspond to a selected one, or combination of, peltier junction elements, e.g., $82_1$–$82_N$ to be activated. The decode logic block 130 is configured in this embodiment to decode the various peltier junction activation codes and activate corresponding ones, or combinations of, the various peltier junction elements comprising the peltier junction device 82. In this embodiment, the peltier junction control logic block 122 is thus operable to minimize the water mass flow rate value, $MF_W$, by selectively activating one or more of the various peltier junction elements comprising the peltier junction device 82.

In an alternate embodiment, table 128 is a one-dimensional table mapping water mass flow rate values, $MF_W$, to corresponding peltier junction element activation codes, wherein each of the peltier junction element activation codes in this embodiment include information corresponding to a selected one, or combination of, peltier junction elements, e.g., $82_1$–$82_N$ to be activated as well as an on-time duration or duty cycle of each selected element. The decode logic block 130 is configured in this embodiment to decode the various peltier junction activation codes and activate corresponding ones, or combinations of, the various peltier junction elements comprising the peltier junction device 82. In this embodiment, the peltier junction control logic block 122 is thus operable to minimize the water mass flow rate value, $MF_W$, by selectively controlling the activation and on-times one or more of the various peltier junction elements comprising the peltier junction device 82.

Other control strategies for the peltier junction control logic block 122 will occur to those skilled in the art, and any such other peltier junction control logic strategies are intended to fall within the scope of the claims appended hereto.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. For example, while system 10 has just been described as being operable to controllably dehumidify the ambient air supplied by air intake conduit 20 to the intake manifold 14, the peltier junction unit 56 or 56' may alternatively or additionally be controlled to assist with cold-weather starting of the engine 12 by heating the intake air supplied to the intake manifold 14. In this embodiment, the polarity of activation signals applied to the peltier junction unit 56 or 56' are simply reversed so that side 92 of the peltier junction device 82 becomes the heating side and side 94 becomes the cooling side. Control circuit 35 may be configured in this embodiment to controllably activate one or more of the peltier junction elements, e.g., $82_1$–$82_N$, and/or the activation times thereof as a function of, for example, the temperature signal produced by temperature sensor 36 or 36', to thereby selectively heat ambient air supplied to the intake manifold 14. Using the concepts described herein as a guideline, configuring the control circuit 35 to accomplish such a task would be a mechanical step for a skilled artisan.

What is claimed is:

1. An intake air dehumidification system for an internal combustion engine, the system comprising:

an intake conduit having one end coupled to an intake manifold of the engine and an opposite end configured to receive ambient air;

a peltier junction device responsive to at least one control signal to cool, and therefore condense moisture from, ambient air supplied by the intake conduit to the intake manifold;

means for determining a specific humidity value corresponding to specific humidity of the ambient air supplied to the intake manifold; and a control circuit producing the at least one control signal as a function of the specific humidity value to maintain the specific humidity of the ambient air supplied to the intake manifold near a target humidity value.

2. The system of claim 1 further including means for dissipating the moisture condensed from the ambient air by the peltier junction device.

3. The system of claim 1 wherein the means for determining a specific humidity value includes:

a temperature sensor positioned downstream of the peltier junction device and producing a temperature signal indicative of the temperature of the ambient air entering the intake manifold;

a pressure sensor positioned downstream of the peltier junction device and producing a pressure signal indicative of the pressure within the intake manifold; and a relative humidity sensor positioned downstream of the peltier junction device and producing a relative humidity signal indicative of the relative humidity of the ambient air entering the intake manifold;

and wherein the control circuit is configured to produce the specific humidity value as a function of the temperature signal, the pressure signal and the relative humidity signal.

4. The system of claim 3 further including a turbocharger having a compressor defining a compressor inlet configured to receive ambient air and a compressor outlet fluidly coupled to the opposite end of the intake conduit;

and wherein the peltier junction device is positioned downstream of the compressor outlet.

5. The system of claim 3 further including a turbocharger having a compressor defining a compressor inlet configured to receive ambient air and a compressor outlet fluidly coupled to the opposite end of the intake conduit;

and wherein the peltier junction device is positioned upstream of the compressor inlet.

6. The system of claim 3 wherein the control circuit includes a closed-loop control strategy configured to produce an error value as a difference between the target humidity value and the specific humidity value, and to produce the at least one control signal in a manner that minimizes the error value.

7. The system of claim 6 wherein the control circuit includes a controller responsive to the error value to produce the at least one control signal.

8. The system of claim 6 wherein the control circuit includes a table mapping error values to corresponding control signal values, the table responsive to the error value to produce the at least one control signal.

9. The system of claim 1 wherein the means for determining a specific humidity value includes:
- a temperature sensor positioned upstream of the peltier junction device and producing a temperature signal indicative of the temperature of the ambient air entering the intake conduit;
- a pressure sensor positioned upstream of the peltier junction device and producing a pressure signal indicative of the pressure of ambient air entering the intake conduit; and
- a relative humidity sensor positioned upstream of the peltier junction device and producing a relative humidity signal indicative of the relative humidity of the ambient air entering the intake conduit;
- and wherein the control circuit is configured to produce the specific humidity value as a function of the temperature signal, the pressure signal and the relative humidity signal.

10. The system of claim 9 wherein the control circuit includes an open-loop control strategy configured to produce an error value as a difference between the target humidity value and the specific humidity value, and to produce the at least one control signal as a function of at least the error value.

11. The system of claim 10 further including a mass air flow sensor producing a mass air flow signal indicative of the mass flow of air past the peltier junction device;
- and wherein the open-loop control strategy is further configured to produce the at least one control signal as a function of a product of the error value and the mass airflow signal.

12. The system of claim 11 further including a turbocharger having a compressor defining a compressor inlet configured to receive ambient air and a compressor outlet fluidly coupled to the opposite end of the intake conduit;
- and wherein the peltier junction device and the mass air flow sensor are each positioned downstream of the compressor outlet.

13. The system of claim 11 further including a turbocharger having a compressor defining a compressor inlet configured to receive ambient air and a compressor outlet fluidly coupled to the opposite end of the intake conduit;
- and wherein the peltier junction device and mass air flow sensor are each positioned upstream of the compressor inlet.

14. The system of claim 1 wherein the peltier junction device defines a cooling side and a heating side;
- and further including a first heat transfer structure mounted to the cooling side of the peltier junction device and disposed in the flow path of the ambient air supplied by the intake conduit to the intake manifold, the cooling side of the peltier junction device and the first heat transfer structure cooperating to cool, and therefore condense moisture from, the ambient air supplied by the intake conduit to the intake manifold.

15. The system of claim 14 further including a second heat transfer structure mounted to the heating side of the peltier junction device and configured to direct heat away from the heating side of the peltier junction device.

16. The system of claim 15 wherein the intake conduit includes first and second separate airflow passages with the peltier junction device mounted therebetween with the cooling side in fluid communication with the first airflow passage and the heating side in fluid communication with the second airflow passage, the first airflow passage having one end coupled to the intake manifold downstream of the peltier junction device and an opposite end configured to receive ambient air upstream of the peltier junction device, the second airflow passage having one end configured to receive ambient air upstream of the peltier junction device and an opposite end vented to ambient downstream of the peltier junction device.

17. The system of claim 15 wherein the peltier junction device is mounted to the intake conduit with the cooling side in fluid communication with ambient air flowing through the intake manifold and with the heating side in fluid communication with ambient.

18. The system of claim 1 further including a moisture collection structure configured to collect moisture condensed from the ambient air supplied by the intake conduit to the intake manifold and to direct the collected moisture away from the ambient air supplied by the intake conduit to the intake manifold.

19. The system of claim 18 wherein the peltier junction device defines a cooling side disposed in the flow path of the ambient air supplied by the intake conduit to the intake manifold and an opposite heating side;
- and wherein the moisture collection structure is configured to direct the collected moisture from the cooling side of the peltier junction device to the heating side of the peltier junction device.

20. The system of claim 19 further including a first heat transfer structure mounted to the cooling side of the peltier junction device and disposed in the flow path of the ambient air supplied by the intake conduit to the intake manifold, the cooling side of the peltier junction device and the first heat transfer structure cooperating to cool, and therefore condense moisture from, the ambient air supplied by the intake conduit to the intake manifold; and
- a second heat transfer structure mounted to the heating side of the peltier junction device and configured to direct heat away from the heating side of the peltier junction device, the moisture collection structure extending from the first heat transfer structure at least to the second heat transfer structure to direct the collected moisture from the first heat transfer structure toward the second heat transfer structure.

21. The system of claim 20 wherein the moisture collection structure comprises at least one moisture absorbent member mounted to the first heat transfer structure and extending through the second heat transfer structure, the moisture absorbent member absorbing moisture condensed by the cooperation of the cooling side of the peltier junction device and the first heat transfer member and directing the absorbed moisture toward the second heat transfer structure for evaporation by the ambient air flowing past the second heat transfer structure.

22. An intake air dehumidification system for an internal combustion engine, the system comprising:
- an intake conduit having one end coupled to an intake manifold of the engine and an opposite end configured to receive ambient air;
- a peltier junction device responsive to a number of control signals to cool, and therefore condense moisture from, ambient air supplied by the intake conduit to the intake manifold;
- means for determining a specific humidity value corresponding to specific humidity of the ambient air downstream of the peltier junction device; and
- a control circuit producing the number of control signals as a function of the specific humidity value to maintain the specific humidity of the ambient air supplied to the intake manifold near a target humidity value.

23. The system of claim 22 further including a turbocharger having a compressor defining a compressor inlet configured to receive ambient air and a compressor outlet fluidly coupled to the opposite end of the intake conduit;

and wherein the peltier junction device is positioned downstream of the compressor outlet.

24. The system of claim 22 further including a turbocharger having a compressor defining a compressor inlet configured to receive ambient air and a compressor outlet fluidly coupled to the opposite end of the intake conduit;

and wherein the peltier junction device is positioned upstream of the compressor inlet.

25. The system of claim 22 wherein the control circuit includes:

means for producing an error value as a difference between the target humidity value and the specific humidity value; and means for producing the number of control signals in a manner that minimizes the error value.

26. The system of claim 25 wherein the means for producing the number of control signals in a manner that minimizes the error value includes:

a controller producing a number of pulse width modulated output signals; and a driver circuit responsive to the number of pulse width modulated output signals to produce the number of control signals, the controller controlling the pulse widths of the output signals as a function of the error signal to control the on-times of a corresponding number of peltier junction elements forming the peltier junction device.

27. The system of claim 25 wherein the peltier junction device includes a number of peltier junction elements;

and wherein the means for producing the number of control signals in a manner that minimizes the error value includes:

a table mapping error values to subset values corresponding to subsets of the number of peltier junction elements;

means responsive to the subset values to enable corresponding subsets of the number of peltier junction elements for operation; and a driver circuit supplying the control signals to each of the enabled peltier junction elements to activate each of the enabled peltier junction elements.

28. An intake air dehumidification system for an internal combustion engine, the system comprising:

an intake conduit having one end coupled to an intake manifold of the engine and an opposite end configured to receive ambient air;

a peltier junction device responsive to a number of control signals to cool, and therefore condense moisture from, ambient air supplied by the intake conduit to the intake manifold;

means for determining a specific humidity value corresponding to specific humidity of the ambient air upstream of the peltier junction device;

a mass air flow sensor producing a mass air flow signal indicative of the mass flow of air past the peltier junction device, and a control circuit producing the number of control signals as a function of the specific humidity value and the mass air flow signal to maintain the specific humidity of the ambient air supplied to the intake manifold near a target humidity value.

29. The system of claim 28 further including a turbocharger having a compressor defining a compressor inlet configured to receive ambient air and a compressor outlet fluidly coupled to the opposite end of the intake conduit;

and wherein the peltier junction device and the mass air flow sensor are each positioned downstream of the compressor outlet.

30. The system of claim 28 further including a turbocharger having a compressor defining a compressor inlet configured to receive ambient air and a compressor outlet fluidly coupled to the opposite end of the intake conduit;

and wherein the peltier junction device and mass air flow sensor are each is positioned upstream of the compressor inlet.

31. The system of claim 28 wherein the control circuit includes:

means for producing an error value as a difference between the target humidity value and the specific humidity value; and means for producing the number of control signals as a function of a product of the error value and the mass air flow signal.

32. The system of claim 31 wherein the peltier junction device includes a number of peltier junction elements;

and wherein the means for producing the number of control signals in a manner that minimizes the error value includes:

a table mapping error values to subset values corresponding to subsets of the number of peltier junction elements;

means responsive to the subset values to enable corresponding subsets of the number of peltier junction elements for operation; and a driver circuit supplying the control signals to each of the enabled peltier junction elements to activate each of the enabled peltier junction elements.

* * * * *